United States Patent [19]

Hiraoka

[11] Patent Number: 5,038,648
[45] Date of Patent: Aug. 13, 1991

[54] ADJUSTABLE SHEAR BLADE BLANKING PRESS WITH AUTOMATICALLY CENTERED BLANK PUSHER

[75] Inventor: Yoshio Hiraoka, Hiroshima, Japan

[73] Assignee: Mazda Motor Manufacturing (USA) Corporation, Flat Rock, Mich.

[21] Appl. No.: 569,287

[22] Filed: Aug. 17, 1990

[51] Int. Cl.$^5$ .............................................. B76D 5/02
[52] U.S. Cl. ..................................... 83/160; 83/155.1; 83/559; 83/581
[58] Field of Search ................ 83/158, 160, 516, 517, 83/581, 559, 404, 404.1, 27, 102, 155.1, 202, 276

[56] References Cited

U.S. PATENT DOCUMENTS 3,455,197  7/1969  Richardson ..................... 83/559 X
3,776,017  12/1973  Ikeda et al. .
4,077,728  3/1978  Makeev et al. ................... 83/158 X

FOREIGN PATENT DOCUMENTS 60-176837  1/1985  Japan .

Primary Examiner—Frank T. Yost
Assistant Examiner—Eugenia A. Jones
Attorney, Agent, or Firm—Wenderoth, Lind & Ponack

[57] ABSTRACT

An adjustable shear blade blanking press with an automatically centered blank pusher has a guide over which a strip of sheet material to be cut into blanks can be guided device extending a cross the guide transversely to the guide in a guide direction, at least two side by side shear blade direction and spaced in the guide direciton, the shear blade devices being pivotally mounted for adjustment of the positions thereof between a position perpendicular to the guide direction and a position at an angle to the guide direction and for adjustment toward and away from each other. A pusher is provided for pushing a cut blank laterally of the guide direction and is adjustably mounted on one side of the guide for reciprocal movement parallel to the guide direction. An automatic center mechanism is connected to the pusher and to the shear blade devices for shifting the position of the pusher to a location midway between corresponding one ends of said shear blade devices in response to the pivoting movement or longitudinal movement of the shear blade devices as the shear blade devices shift positions.

6 Claims, 3 Drawing Sheets

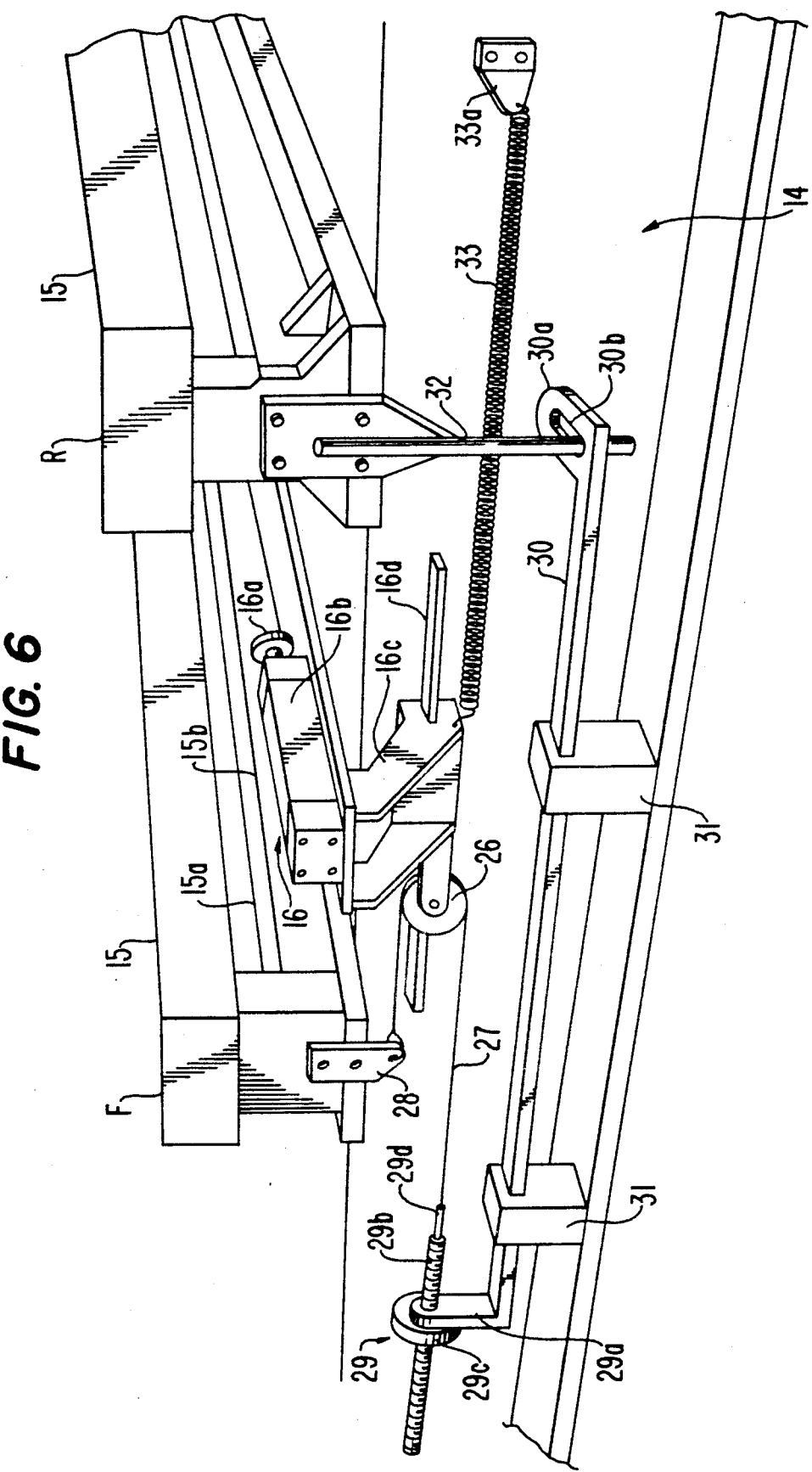

ADJUSTABLE SHEAR BLADE BLANKING PRESS WITH AUTOMATICALLY CENTERED BLANK PUSHER

The present invention relates to an adjustable shear blade blanking press, and more particularly to such a press with an automatically centered blank pusher which pushes blanks cut from a strip of sheet material out of the press.

BACKGROUND OF THE INVENTION

Blanking presses for cutting blanks from sheet material are well known, and in some such presses, such as shown in U.S. Pat. No. 3,776,017 and Japanese Published Application No. 60-20335, pushers are provided to push the cut blanks out of the press laterally of the direction in which the strip material from which the blanks are cut is fed to the press. In order to make it possible to cut various shapes of blanks from a strip of sheet material, such a press has been developed which has adjustable shear blades.

One such blanking press is shown in Japanese Published Application No. 60-176837, published Nov. 22, 1985, in which there is provided a single shear blade means which can be pivoted from a position transverse to the path of a strip of sheet material in opposite directions so as to cut either rectangular blanks from the end of the strip or trapezoidal blanks from the end of the strip.

An improved version of such a press is also known, as shown in FIGS. 1 and 2, in which the press is provided with a pair of adjustable shear blade means 15, which extend transversely of the path of a sheet of material 10, such as sheet metal, fed from a roll 11 of such material through a leveler 12 to the press 13. The adjustable shear blade means 15 extends generally transversely of the direction of travel of the strip 10 of sheet material, and can be moved closer together or farther apart relative to each other, and can be pivoted freely from positions which are transverse to the direction of travel of the sheet to positions which are at an angle to the direction of travel of the sheet. Thus, with the adjustable shear blade means 15 extending transversely across the sheet at angles to the direction of travel of the sheet, with the one ends on one side closer together than the ends on the other side, as shown in FIG. 1, two equilaterial trapezoidal blanks A and B can be cut from the end of the strip at each operation of the press. If the blanks cut from the sheet in a preceding step are equilaterally shaped trapezoids, then the blank B at the extreme end of the strip can be made the same shape, but oriented 180° to blank A, and the blank A will be a similarly shaped trapezoidal sheet with the same orientation as the blank which has been last cut from the strip.

Alternatively, by adjusting the position of one or the other of the adjustable shear blade means 15 so that it is perpendicular to the direction of travel of the strip, while leaving the other of the adjustable shear blade means 15 at an angle, irregular trapezoidal shapes, such as the shapes C and D in FIG. 3 can be cut from the end of the strip. By further adjusting the other adjustable shear blade means 15 so that it too is perpendicular to the direction of travel, rectangular shapes such as shapes E and F can be cut from the end of the strip. By adjusting the distance between the shear blade means 15, i.e. by moving one or the other, or both, the blanks can be made shorter or longer.

Thus, for any such shapes, two similarly shaped blanks can be cut from the end of the strip at the same time rather than just one as with the above-described press. In conjunction with the press 13 there is provided a longitudinal conveyor 17, shown at the right end of the press in FIGS. 1 and 2, which conveys the blank B cut from the end of the strip in the direction of travel of the strip to a stack 18 of cut blanks.

However, the blank A which is cut from between the adjustable shear blade means 15 must be moved laterally of the direction of conveyance of the strip 10, and for this purpose, a pusher 16 is provided along the edge of the conveyor between the one ends of the shear blade means, which, after the blank A has been cut from between the adjustable shear blade means 15, is actuated to push the blank A laterally of the direction of conveyance onto a lateral conveyor 19, which delivers the blank to a stack 20 of such blanks.

It is necessary, regardless of the shape of the blanks, that for good lateral conveyance of the blank A cut from between the adjustable shear blade means 15 that the pusher 16 engage the edge of the blank A midway between the one ends of the adjustable shear blade means 15.

In currently used presses of this type, when the positions of the adjustable shear blade means 15 are changed, the pusher 16 is manually shifted so that it is positioned midway between the one ends of the adjustable shear blade means positioned in their new positions. Such adjustment of the position of the pusher is done manually by an operator, and, while this can sometimes be accomplished during the time it takes to shift the positions of the adjustable shear blade means, it is frequently required to readjust the position of the pusher to get it in the exact location. This takes additional time and effort, which delays the startup of the means for feeding the strip of sheet material, and also requires the presence of an operator to make the adjustment.

OBJECT AND BRIEF SUMMARY OF THE INVENTION

It is therefore an object of the present invention to provide means for automatically centering the blank pusher in an adjustable shear blade blanking press, which does not require the presence of an operator to make the adjustment of the position when the positions of the adjustable shear blade means are changed.

It is a further object of the present invention to provide such an automatic centering means which responds to the movement of the one ends of the adjustable shear blade means so as to automatically move the pusher so that it remains halfway between the one ends of the adjustable shear blade means.

These objects are achieved, according to the present invention, by the provision of an adjustable shear blade blanking press with an automatically centered blank pusher, which comprises a guide means over which a strip of sheet material to be cut into blanks can be guided in a guide direction; at least two side by side shear blade means extending across said guide means transversely to said direction and spaced in said guide direction, said shear blade means being pivotally mounted for adjustment of the positions thereof between a position perpendicular to said direction and a position at an angle to said direction and being mounted for adjustment of the positions thereof toward and away relative to each other in said direction; a pusher means for pushing a cut blank laterally of said direction, said pusher means being movably mounted on one side of said guide means for reciprocal movement parallel to said direction; and automatic centering means connected to said pusher means and to said shear blade means for shifting the position of said pusher means to a location midway between corresponding one ends of said shear blade means in response to the pivoting movement of said shear blade means as said shear blade means shift between said positions perpendicular to said direction and said positions at an angle to said direction and movement of said shear blade means toward and away relative to each other in said direction.

The automatic centering means can comprise means connected between the said one ends of said shear blade means and said pusher means for moving said pusher means in the same direction as said one end of the respective shear blade means moves during adjustment and one half the distance said one end of the respective shear blade means moves during adjustment.

In particular, the means connected between the one ends of the shear blade means and the pusher means can comprise a pulley on said pusher means, a longitudinally shiftable rod having one end mounted on one of said shear blade means and having the other end of said rod being free and positioned on the opposite side of said pusher means from said one of said shear blade means, a pulley line connected between the other of said shear blade means and extending around said pulley and being attached to said free end of said shiftable rod, and a tension spring means connected to said pusher means for exerting a force on said pusher means parallel to said direction and toward said one of said shear blade means.

Other and further objects and advantages of the invention will become apparent from the following description of a specific embodiment thereof, taken together with the accompanying drawings, in which:

BRIEF DESCRIPTION OF THE FIGURES

FIG. 6 is a further perspective view, on an enlarged scale, of the blanking press of FIG. 5.

DETAILED DESCRIPTION OF THE INVENTION

Figure 1:
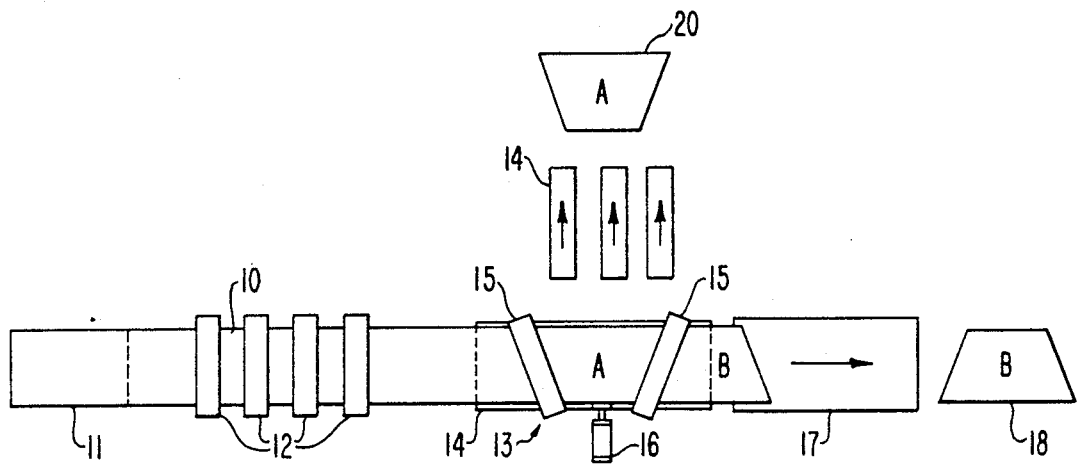
FIG. 1 is a schematic plan view of a conventional adjustable shear blade blanking press with a manually adjustable pusher for pushing blanks laterally out of the press.
Figure 2:
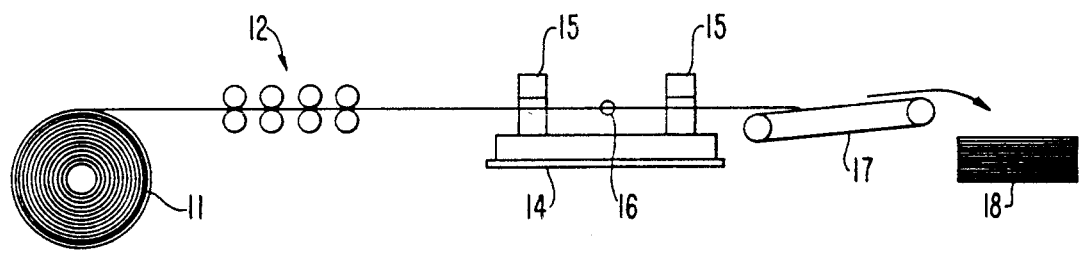
FIG. 2 is a schematic side elevation view of the apparatus of FIG. 1.
Figure 3:
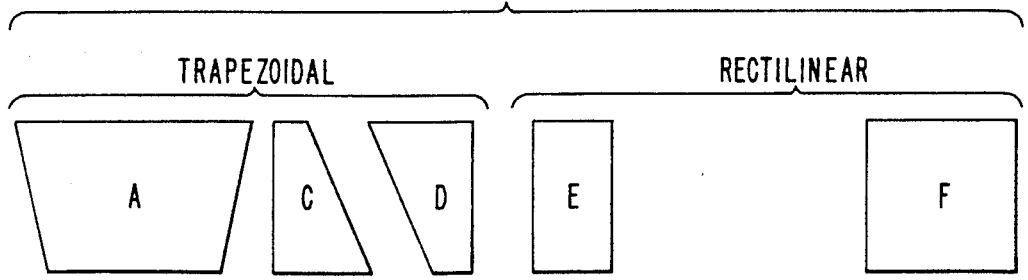
FIG. 3 is a schematic plan view of shapes of blanks which can be cut by the operation of the apparatus of FIGS. 1 and 2.

The blanking press of the present invention is comprised of the conventional blanking press of FIGS. 1 and 2, with an automatic pusher centering means incorporated therein.

Figure 4:
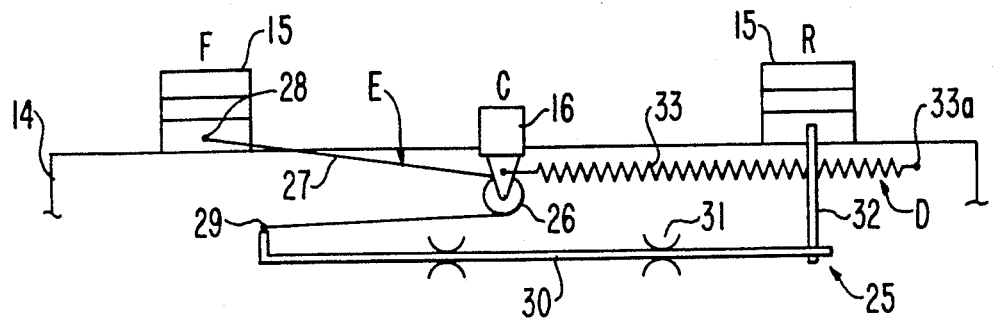
FIG. 4 is a schematic side elevation view of an automatic pusher centering means according to the present invention which is mountable in the apparatus of FIGS. 1 and 2 in place of the manually actuated pusher therein.

Referring to FIG. 4, the automatic pusher centering means 25 according to the present invention comprises means for shifting the position of the pusher means 16 of the blanking press to a location midway between the corresponding one ends of two adjustable shear blade means 15, namely shear blade means F and shear blade means R, in response to the pivoting movement of these shear blade means as the shear blade means shift between positions perpendicular to the direction of conveyance of the strip 10 of sheet material, and positions at an angle to said direction, and movement of said shear blade means toward and away relative to each other in said direction.

Figure 5:
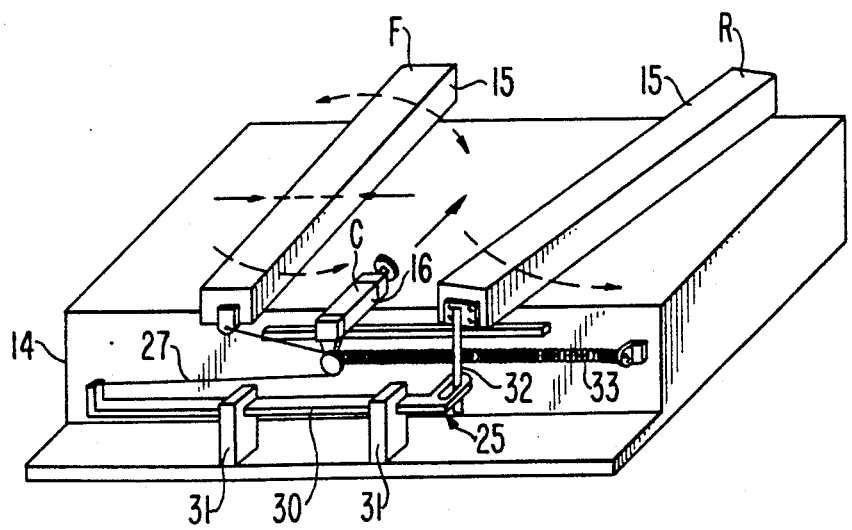
FIG. 5 is a perspective view of an adjustable shear blade blanking press according to the present invention.

More specifically, the automatic pusher centering means 25 comprises means which is connected between the one ends of the shear blade means 15 which are on the near side of the press as shown in FIGS. 4-6, and the pusher means 16 for moving the pusher means 16 in the same direction as the one end of the respective shear blade means 15 moves during pivoting movement toward or away from the other shear blade means 15, and through a distance which is one-half the distance the one end of the respective shear blade means 15 moves. Thus, if the end of the adjustable shear blade means F in FIG. 4 which is toward the viewer of the figure moves to the right, the automatic pusher centering means moves the pusher 16 in the corresponding direction, i.e. to the right, but only one-half of the distance which the one end of the adjustable shear blade means F moves. Similarly, if the one end of the adjustable shear blade means F moves to the left, the pusher 16 is moved to the left, but only one-half the distance which the one end of the adjustable shear blade means F moves. Similar movement corresponding to the movement of the one end of the adjustable shear blade means R is carried out when the one end of the adjustable shear blade means R is moved in response to pivoting of the adjustable shear blade means R or its movement toward or away from the shear blade means F.

The specific means for automatically centering the pusher 16 is constituted by a pulley 26 mounted on the pusher means 16, a longitudinally shiftable rod 30 having one end mounted on one end of one of the shear blade means 15, namely the shear blade means R, through a shear blade means support 32, and which longitudinally shiftable rod 30 has the other end as a free end with a line end support 29 thereon, and a pulley line 27 connected between the one end of the other of the shear blade means 15, namely the adjustable shear blade means F, and the line end support 29, and extending around the pulley 26. Longitudinally shiftable rod 30 is guided in its longitudinal shifting movement in rod guides 31. A tension spring 33 is connected to the pusher 16 and is anchored on a spring attachment 33a on a guide base 14 of the press, and exerts a force on the pusher means 16 parallel to the direction of movement of the sheet material and toward the one of the shear blade means, namely the shear blade means R.

It will be seen that when the near end of the adjustable shear blade means F moves to the left, it exerts a force on the fixed length line 27 which causes the pulley 26 to rotate and to move the pusher 16 to the left, but only by a distance one-half the distance which the near end of the adjustable shear blade F moves to the left. Movement in this direction will increase the tension in the spring 33.

Conversely, movement of the near end of the adjustable shear blade means F to the right will cause the tension spring 33 to draw the pusher 16 to the right, but it will be restrained by the fixed length line 27, so that the movement of the pusher 16 will be only half the movement of the adjustable shear blade means F.

Similarly, movement of the near end of the adjustable shear blade means R to the right or the left will cause shifting of the longitudinally shiftable rod 30 in the corresponding direction, to either exert a force to the left on the fixed length line, which will cause the pusher 16 to move to the left one-half the distance of the movement of the near end of the adjustable shear blade means R and against the tension of the spring 33. Movement of the near end of the adjustable shear blade means R in the opposite direction will move the longitudinally shiftable rod 30 to the right, thus allowing the pusher 16 to be drawn to the right by the force in the tension spring 33.

It will be further understood that if the near ends of both the adjustable shear blade means are moved in one or the other direction, the net movement of the pusher 16 will be one-half the distance of the respective movements of the near ends of the adjustable shear blade means F and R, which will cause the pusher 16 to remain always one-half way between the near ends of the adjustable shear blade means F and R.

The specific structure of the pulley apparatus of FIG. 4 is shown more fully in FIGS. 5 and 6, in which the adjustable shear blade means 15 are also shown in somewhat more detail as having an upper shear blade 15a and a lower shear blade 15b. In the actual apparatus, one of the blades is movable past the other of the blades for shearing a sheet of material which is led between these blades in each of the adjustable shear blade means. Included in the adjustable shear blade means are conventional means (not shown) for driving the movable shear blade past the fixed shear blade.

The respective adjustable shear blade means 15 are mounted on the press for pivotable movement in the direction of the dashed arrows in FIG. 5, and in addition, at least one of the two blades is also movable in translation in the direction of movement of the sheet material through the press. Thus, the shape of the blank being cut by the two adjustable shear blade means as well as the longitudinal dimension, i.e. the dimension in the direction of movement of the sheet through the press, can be adjusted. The means for pivoting the shear blade means and moving them in translation is not shown, since it is conventional in presses of this type. Hydraulic piston-cylinder devices, motor driven threaded shafts extending through nuts on the shear blade means, and the like, can be used. It is preferred to use a lazy tongs type linkage (not shown) to connect the shear blade means for insuring that they remain in the proper relative positions once they are moved thereto.

The pusher 16 is comprised of a pusher head 16a which is driven by a piston-cylinder device 16b, mounted on a pusher support 16c. The pusher support 16c is guided along the side of the base 14 on a pusher guide 16d. Mounted on the side of the pusher support 16c is the pulley 26, and to the opposite side of the pusher support 16c is connected the tension spring 33, a free end of which is anchored to the base 14 by a spring attachment 33a.

A line end fastener 28 depends from the near end of the left hand adjustable shear blade means F, and to this line end fastener 28 is attached one end of the fixed length line 27, and the line is run around the pulley 26. The line can be any conventional material, such as wire cable or the like.

Depending from the near end of the other adjustable shear blade means 15 is a shear blade means support 32, the lower end of which is engaged in a slot 30b in a lateral projection 30a on the longitudinally shiftable rod 30. The longitudinal shiftable rod 30 is slidable through two upright rod guides 31, and the end opposite the end with the lateral projection 30a thereon is a free end which has an upright support member 29a thereon.

Threaded into the upper end of the support member 29a is a threaded rod 29b having on one end a line attaching loop 29d, and having an adjustable stop 29c threaded on the other end for engagement with the support member 29a to adjust the position of the line attaching loop 29d.

The operation of this structure is the same as described for the schematic showing thereof in FIG. 4, and will not be repeated.

The operation of the apparatus is the same as the operation of the conventional apparatus, described hereinbefore with reference to FIGS. 1 and 2, except that the position of the pusher 16 will always be halfway between the one ends of the adjustable shear blade means 15, namely the near ends in FIGS. 4–6. Upon completion of the cutting of the blanks, such as the blanks A and B, from the end of the strip 10, the blank B will be picked up by the longitudinal conveyor 17 and conveyed to the stack 18. The piston-cylinder mechanism 16b of the pusher is then actuated to move the pusher head 16a outwardly, so as to push the blank between the adjustable shear blade means laterally onto the conveyor 19, for delivery to the stack 20.

When different shaped blanks are to be cut, the driving means for pivoting the adjustable shear blade means and for moving the one adjustable shear blade means along the press in the direction of movement of the sheet are actuated so as to obtain the desired shape and size, and during this adjustment, the pusher 16 will be automatically driven through the pulley system so as to be centered between the near ends of the adjustable shear blade means 15 at the conclusion of the movement of the adjustable shear blade means 15. The press will be ready for immediate operation, since no manual adjustment of the pusher 16 is needed.

The initial position of the pusher 16 can be adjusted by use of the threaded rod 29b and the stop 29c.

It will thus be seen that there has been provided an automatic pusher centering means for automatically centering the pusher 16 in response to the movement of the one ends, i.e. the near ends in FIGS. 4–6, of the adjustable shear blade means. The necessity for providing an operator, and the necessity for the operator to manually shift the pusher 16 and adjust its final position is eliminated, thereby improving the operation of the press, and reducing the time during which the press must remain operative after adjustment of the adjustable shear blade means 15.

What is claimed is:

1. An adjustable shear blade blanking press with an automatically centered blank pusher, comprising:
   a guide means over which a strip of sheet material to be cut into blanks can be guided in a guide direction;
   at least two side by side shear blade means extending across said guide means transversely to said direction and spaced in said guide direction, said shear blade means being pivotally mounted for adjustment of the positions thereof between a position perpendicular to said direction and a position at an angle to said direction and being mounted for adjustment of the positions thereof toward and away relative to each other in said direction;

a pusher means for pushing a cut blank laterally of said direction, said pusher means being adjustably mounted on one side of said guide means for reciprocal movement parallel to said direction; and automatic centering means connected to said pusher means and to said shear blade means for shifting the position of said pusher means to a location midway between corresponding one ends of said shear blade means in response to the pivoting movement of said shear blade means as said shear blade means shift between said positions perpendicular to said direction and said positions at a angle to said direction and movement of said shear blade means toward and away relative to each other in said direction.

2. An adjustable shear blade blanking press as claimed in claim 1 in which said automatic centering means comprises means connected between the said one ends of said shear blade means and said pusher means for moving said pusher means in the same direction as said one end of the respective shear blade means moves during adjustment and one-half the distance said one end of the respective shear blade means moves during adjustment.

3. An adjustable shear blade blanking press as claimed in claim 2 in which said means connected between said one ends of said shear blade means and said pusher means comprises a pulley on said pusher means, a longitudinally shiftable rod having one end mounted on one of said shear blade means and having the other end of said rod being free and positioned on the opposite side of said pusher means from said one of said shear blade means, a pulley line connected between the other of said shear blade means and extending around said pulley and being attached to said free end of said shiftable rod, and a tension spring means connected to said pusher means for exerting a force on said pusher means parallel to said direction and toward said one of said shear blade means.

4. An automatic pusher centering means for an adjustable shear blade blanking press having a guide means over which a strip of sheet material to be cut into blanks can be guided in a guide direction, at least two side by side shear blade means extending across said guide means transversely to said direction and spaced in said guide direction, said shear blade means being pivotally mounted for adjustment of the positions thereof between a position perpendicular to said direction and a position at an angle to said direction and being mounted for adjustment of the positions thereof toward and away relative to each other in said direction and a pusher means for pushing a cut blank laterally of said direction, said pusher means being adjustably mounted on one side of said guide means for reciprocal movement parallel to said direction, said automatic pusher centering means comprising:

automatic centering means adapted to be connected to said pusher means and to said shear blade means and responsive to the pivoting movement of said shear blade means as said shear blade means shift between said positions perpendicular to said direction and said positions at an angle to said direction and movement of said shear blade means toward and away relative to each other in said direction for shifting the position of said pusher means to a location midway between corresponding one ends of said shear blade means.

5. An automatic pusher centering means as claimed in claim 4 in which said automatic centering means comprises means adapted to be connected between the said one ends of said shear blade means and said pusher means for moving said pusher means in the same direction as said one end of the respective shear blade means moves during adjustment and one-half the distance said one end of the respective shear blade means moves during adjustment.

6. An automatic pusher centering means as claimed in claim 5 in which said means adapted to be connected between said one ends of said shear blade means and said pusher means comprises a pulley adapted to be mounted on said pusher means, a longitudinally shiftable rod having one end adapted to be mounted on one of said shear blade means and having the other end of said rod being free and positioned on the opposite side of said pusher means from said on of said shear blade means, a pulley line adapted to be connected to the other of said shear blade means and extending around said pulley and being attached to said free end of said shiftable rod, and a tension spring means connected to said pusher means for exerting a force on said pusher means parallel to said direction and toward said one of said shear blade means.

* * * * *